US006847787B2

(12) United States Patent  
Halgren et al.

(10) Patent No.: US 6,847,787 B2  
(45) Date of Patent: Jan. 25, 2005

(54) WDM NETWORK NODE MODULE

(75) Inventors: Ross Halgren, Collaroy Plateau (AU); Richard Lauder, Maroubra (AU); Chia Seiler, Bairnsdale (AU)

(73) Assignee: Redfern Broadband Networks Inc., Wilmington, DE (US)

( * ) Notice: Subject to any disclaimer, the term of this patent is extended or adjusted under 35 U.S.C. 154(b) by 544 days.

(21) Appl. No.: 09/948,942

(22) Filed: Sep. 7, 2001

(65) Prior Publication Data

US 2003/0048504 A1 Mar. 13, 2003

(51) Int. Cl.$^7$ .............................................. H04B 10/20
(52) U.S. Cl. ........................................ 398/83; 398/58
(58) Field of Search ............................ 398/58, 59, 60, 398/82, 83, 84, 85

(56) References Cited

U.S. PATENT DOCUMENTS

2003/0169470 A1 * 9/2003 Alagar et al. ................ 359/110  
2004/0141746 A1 * 7/2004 Oberg ........................... 398/59

* cited by examiner

Primary Examiner—Jason Chan  
Assistant Examiner—Christina Y Leung  
(74) Attorney, Agent, or Firm—Christie, Parker and Hale, LLP

(57) ABSTRACT

A WDM add/drop module for use in a network node of an optical network, the module comprising an optical drop unit for dropping a first wavelength signal travelling along a first path in the optical network traffic, a trunk receiver unit for converting the first wavelength signal into a first electrical signal, a tributary optical transmitter unit for converting an electrical input signal into a first optical signal for transmission along a tributary optical connection, wherein the output of the trunk receiver unit is connected to the tributary optical transmitter unit and to a first interface port of the WDM drop module for interfacing with another WDM drop unit, an electrical switch unit arranged in a manner such that, in use, selectively either the first electrical signal or a second electrical signal received at a second interface port of the WDM add/drop module from another WDM add/drop module is through connected to the tributary transmitter unit for conversion and transmission along the tributary optical connection, a tributary optical receiver unit for converting a second optical signal received along a second tributary optical connection into a third electrical signal, a trunk transmitter unit for converting an electrical input signal into a second wavelength signal, an optical add unit for adding the second wavelength signal for transmission along the first path in the optical network traffic, a switch unit arranged in a manner such that, in use, selectively either the third electrical signal or a fourth electrical signal received at a third interface port of the WDM add/drop module from another WDM add/drop module is through connected to the trunk transmitter unit, and wherein the output of the tributary receiver unit is connected to the trunk transmitter unit and/or to a fourth interface port of the WDM add/drop module for interfacing with another WDM add/drop unit.

26 Claims, 4 Drawing Sheets

WDM NETWORK NODE MODULE

FIELD OF THE INVENTION

The present invention relates broadly to a WDM drop module for use in a network node of an optical network, to a WDM add module for use in a network node of an optical network, to a WDM add/drop module for use in a network node of an optical network, and to a network node or an optical network incorporating such WDM drop, WDM add, or WDM add/drop modules.

BACKGROUND OF THE INVENTION

In wavelength division multiplexing (WDM) based optical networks such as course WDM (CWDM) networks, different wavelengths are assigned to different WDM channels for distributing data along e.g. an optical ring network. The various WDM channel signals may be added and/or dropped at individual network nodes connected in-line on the optical ring network for distributing and receiving data to and from subscribers.

It has been proposed in such CWDM networks to design the network nodes in a manner which enables each WDM channel to carry data of a different protocol, e.g. different speed data protocols. Furthermore, it has been proposed to design such CWDM networks in a manner which enables different wavelength channels to be selectively added or dropped at individual network nodes, as opposed to fixed wavelength(s) being added or dropped at individual network nodes based on an initial network design. Yet further it has been proposed to design such CWDM networks in a manner which enables each individual CWDM channel to be transmitted in pairs of wavelengths in different directions along the optical ring network if required to e.g. implement a single path protected channel.

However, while such proposals seek to provide a highly flexible and upgradable optical network design, it has been recognised by the inventors that such a network design results in high entry costs for the deployment of an optical network, which may render such network designs unsuitable for competing with or breaking into the existing electrical or optical communication networks market.

In at least preferred embodiments, the present invention therefore seeks to provide CWDM network node modules offering reduced entry costs in the deployment of optical networks.

SUMMARY OF THE INVENTION

In accordance with a first aspect of the present invention there is provided a WDM drop module for use in a network node of an optical network, the module comprising:
  an optical drop unit for dropping a first wavelength signal travelling along a first path in the optical network traffic,
  a trunk receiver unit for converting the first wavelength signal into a first electrical signal,
  a tributary optical transmitter unit for converting an electrical input signal into an optical signal for transmission along a tributary optical connection,
  wherein the output of the trunk receiver unit is connected to the tributary optical transmitter unit and to a first interface port of the WDM drop module for interfacing with another WDM add and/or drop unit, and
  a switch element arranged in a manner such that, in use, selectively either the first electrical signal or a second electrical signal received at a second interface port of the WDM drop module from another WDM drop module is through connected to the tributary transmitter unit.

Preferably, the WDM drop module further comprises a regeneration unit for regenerating the first electrical signal. In one embodiment, the regeneration unit is adapted to perform 3R regeneration of the first electrical signal.

The connection between the output of the trunk receiver unit and the tributary optical transmitter unit and the interface port may be arranged in a manner such that the trunk receiver unit is selectively connectable to either the tributary optical transmitter unit or the interface port.

Alternatively, the connection may be arranged in a manner such that the trunk receiver unit is connected simultaneously to the tributary optical transmitter unit and to the interface port.

In accordance with a second aspect of the present invention there is provided a WDM add module for use in a network node of an optical network, the module comprising:
  a tributary optical receiver unit for converting an optical signal received along a tributary optical connection into a first electrical signal,
  a trunk transmitter unit for converting an electrical input signal into a first wavelength signal,
  an optical add unit for adding the first wavelength signal for transmission along a first path in the optical network traffic,
  a switch unit arranged in a manner such that, in use, selectively either the first electrical signal or a second electrical signal received at a first interface port of the WDM add module from another WDM add module is through connected to the trunk transmitter unit, and
  wherein the output of the tributary optical receiver unit is connected to the switch element and to a second interface port of the WDM add module for interfacing with another WDM add unit.

Preferably, the WDM add module further comprises a regeneration unit for regenerating the electrical signal. In one embodiment the regeneration unit is adapted to preform 3R regeneration of the electrical signal.

The connection between the output of the tributary optical receiver unit and the switch element and the interface port may be arranged in a manner such that the output of the tributary optical receiver unit is selectively connected to either the switch element or the interface port.

Alternatively, the connection may be arranged in a manner such that the output of the tributary optical receiver unit is simultaneously connected to both the switch element and the interface port.

In accordance with a third aspect of the present invention there is provided a WDM add/drop module for use in a network node of an optical network, the module comprising:
  an optical drop unit for dropping a first wavelength signal travelling along a first path in the optical network traffic,
  a trunk receiver unit for converting the first wavelength signal into a first electrical signal,
  a tributary optical transmitter unit for converting an electrical input signal into a first optical signal for transmission along a tributary optical connection,
  wherein the output of the trunk receiver unit is connected to the tributary optical transmitter unit and to a first interface port of the WDM drop module for interfacing with another WDM drop unit,
  an electrical switch unit arranged in a manner such that, in use, selectively either the first electrical signal or a second electrical signal received at a second interface port of the WDM add/drop module from another WDM add/drop module is through connected to the tributary transmitter unit for conversion and transmission along the tributary optical connection, a tributary optical receiver unit for converting a second optical signal received along a second tributary optical connection into a third electrical signal, a trunk transmitter unit for converting an electrical input signal into a second wavelength signal, an optical add unit for adding the second wavelength signal for transmission along the first path in the optical network traffic, a switch unit arranged in a manner such that, in use, selectively either the third electrical signal or a fourth electrical signal received at a third interface port of the WDM add/drop module from another WDM add/drop module is through connected to the trunk transmitter unit, and wherein the output of the tributary receiver unit is connected to the trunk transmitter unit and/or to a fourth interface port of the WDM add/drop module for interfacing with another WDM add/drop unit.

Preferably, the electrical switch elements are implemented as a single electrical switching unit.

In one embodiment, the electrical switching unit is further arranged in a manner which provides the connections to the first and fourth interface ports.

The connection between the output of the trunk receiver unit and the tributary optical transmitter unit and the first interface port may be arranged in a manner such that the trunk receiver unit is selectively connectable to either the tributary optical transmitter unit or the first interface port.

Alternatively, the connection may be arranged in a manner such that the trunk receiver unit is connected simultaneously to the tributary optical transmitter unit and to the first interface port.

The connection between the output of the tributary optical receiver unit and the switch element and the fourth interface port may be arranged in a manner such that the output of the tributary optical receiver unit is selectively connected to either the switch element or the fourth interface port.

Alternatively, the connection may be arranged in a manner such that the output of the tributary optical receiver unit is simultaneously connected to both the switch element and the fourth interface port.

In one embodiment, the WDM add/drop unit further comprises:

a further optical drop unit for dropping a third wavelength signal travelling along a second path in the optical network traffic, a further trunk receiver unit for converting the third wavelength signal into a fifth electrical signal, a further trunk transmitter unit for converting an electrical input signal into a fourth wavelength signal, a further optical add unit for adding the fourth wavelength signal for transmission along the second path in the optical network traffic, and the electrical switching unit is arranged in a manner such that, in use, selectively either the first, second, or fifth electrical signal is through connected to the tributary transmitter unit for conversion and transmission along the tributary optical connection, and such that the third electrical signal is through connected to the first and/or the further trunk transmitter units and/or to the fourth interface port.

The third and fourth wavelength signals may be of the same wavelengths as the first and second wavelength signals respectively. Alternatively, the third and fourth wavelength signals are different from the first and second wavelength signals respectively.

The WDM add/drop module preferably further comprises a regeneration unit for regenerating the first, and/or third, and/or fourth electrical signals. The regeneration unit may be adapted to perform 3R regeneration of the first, and/or third, and/or fourth electrical signals.

In accordance with a fourth aspect of the present invention there is provided an WDM optical network incorporating a WDM drop module as defined in the first aspect.

In accordance with a fifth aspect of the present invention there is provided an WDM optical network incorporating a WDM add module as defined in the second aspect.

In accordance with a sixth aspect of the present invention there is provided an WDM optical network incorporating a WDM add/drop module as defined in the third aspect.

BRIEF DESCRIPTION OF THE DRAWINGS

Embodiments of the present invention will now be described, by way of example only, with reference to the accompanying drawings.

DETAILED DESCRIPTION OF THE EMBODIMENTS

The preferred embodiments described provide CWDM network node modules which can provide a low cost entry in the deployment of a CWDM network design.

Figure 1:
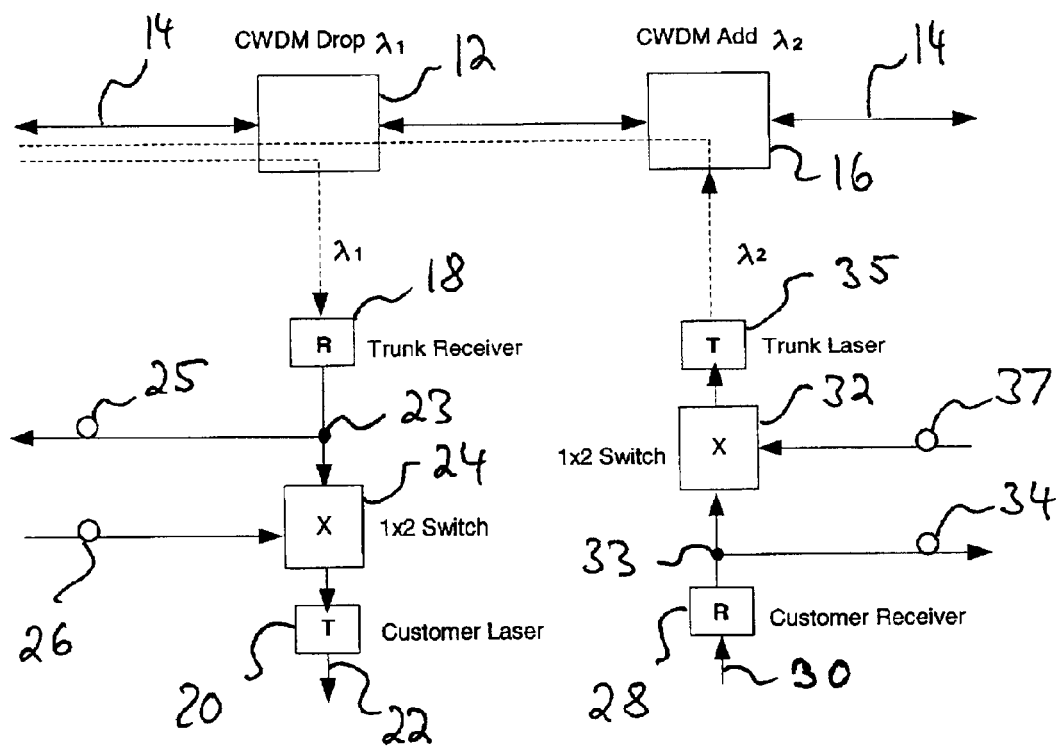
FIG. 1 is a schematic drawing of a WDM add/drop module embodying the present invention.

In FIG. 1, a WDM add/drop module 10 comprises a fixed wavelength drop unit 12 adapted to drop CWDM wavelength $\lambda_2$, travelling in a west-east direction on the optical network 14.

The WDM add/drop module 10 further comprises a WDM add unit 16 for adding a WDM signal at $\lambda_2$ for transmission along an east-west direction along the optical network 14.

Together, the wavelength pair $\lambda_1$ and $\lambda_2$ form a bi-directional CWDM channel of the optical network 14.

The WDM add/drop module 10 further comprises a trunk receiver unit 18 for converting the WDM signal at $\lambda_1$, into an electrical signal, and a tributary transmitter unit 20 for converting an electrical input signal into an optical signal for transmission along a tributary optical connection 22 to a subscriber (not shown). A junction element 23 is disposed after the trunk receiver unit 18 in a manner such that the electrical signal (converted from the WDM signal at $\lambda_1$) is through connected to an electrical switch 24 and a first port 25 of the WDM add/drop module 10 for interfacing with another WDM add/drop module (not shown). It is noted that the electrical signal may be interfaced to be re-added at another WDM add/drop module in a bypass configuration, or dropped at the WDM add/drop module.

The electrical switch 24 is disposed between the trunk receiver unit 18 and the tributary transmitter unit 20. The switch 24 is arranged in a manner such that selectively either the electrical signal from the trunk receiver unit 18 or an electrical signal received at a trunk receiver port 26 is through-connected to the tributary transmitter unit 20. Accordingly, either the WDM signal at $\lambda_1$ or another WDM signal dropped at e.g. an adjacent WDM add/drop module similar to the WDM add/drop module 10 can be transmitted to the transcriber (not shown) to effect wavelength and/or path protection for that particular subscriber.

The WDM add/drop module 10 further comprises a tributary receiver unit 28 for receiving an optical signal along a further tributary optical connection 30. It is noted here that the tributary optical connections 22, 30 may be combined into a bi-directional single-fibre connection through a appropriate combiner element. The tributary receiver unit 28 converts the received optical signal into an electrical signal, which is through connected to an electrical switch 32. A junction element 33 is disposed between the tributary receiver unit 28 and the switch 32 in a manner such that the electrical signal (converted from the optical signal received at the tributary receiver unit 28) is through connected to the switch 32, as well as to a further port 34 of the WDM add/drop unit 10 for interfacing with another WDM add/drop module (not shown).

The electrical signal (converted from the optical signal received at the tributary receiver unit 28) can be through connected to a trunk transmitter unit 35 for conversion into a WDM signal at $\lambda_2$ for transmission along the optical network 14 in a east-west direction. Alternatively, the switch 32 be placed into a switching state in which another electrical signal received at a trunk transmitter port 37 of the WDM add/drop module. In that switching state, the WDM add/drop module 10 can function to add a signal to the optical network 14 in a manner suitable for effecting wavelength and/or path protection for another WDM add/drop module.

The example embodiment described above with reference to FIG. 1 avoids the use of any large electrical switches by optically separating the channels and associating a particular channel with a particular tributary interface at the time of the installation. The WDM channel add/drop modules are used to optically peel out channels (two wavelengths per optical-select module). A signal laser and receiver pair comprises the optical to electrical interface. The electronic signals are distributed to other modules via a backplane, to enable protection switching, before being passed to the customer interface via electrical conversion. Small electrical switches are used to select between the locally dropped signal and potentially available backplane signals.

Figure 2:
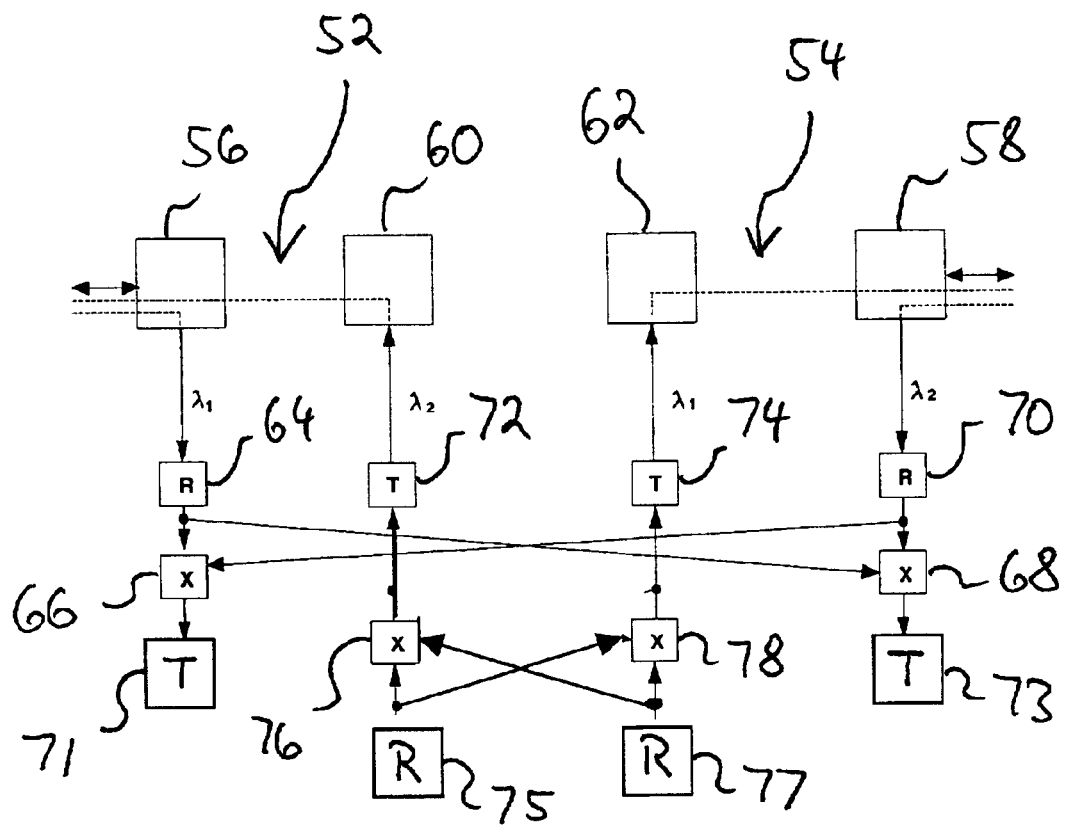
FIG. 2 is a schematic drawing of a WDM add/drop structure embodying the present invention.

FIG. 2 shows a WDM add/drop structure 50 which incorporates two WDM add/drop modules 52 and 54. Each of the WDM add/drop modules 52, 54 are of the type of WDM add/drop module 10 described above with reference to FIG. 1. In the embodiment shown in FIG. 2, the WDM drop units 56 and 58 of WDM add/drop module 52 and WDM add/drop module 54 respectively are designed for wavelengths $\lambda_1$, $\lambda_2$ respectively. Similarly, the WDM add units 60, 62 are designed for the same wavelengths $\lambda_2$, $\lambda_1$ respectively.

In FIG. 2, the following cross connections has been effected between the WDM add unit 60, 62 and WDM drop units 56 and 58 as follows:

After the trunk receiver unit 64 the electrical signal converted from the WDM signal $\lambda_1$ is through connected to the switch unit 66 as well as to the switch unit 68 associated with the WDM drop unit 58. Similarly, after the trunk receiver unit 70 associated with the WDM unit 58, the electrical signal converted from the WDM channel $\lambda_2$ is through connected to the switch 68 as well as to the switch 66 associated with the WDM unit 56. Accordingly, either electrical signals corresponding to WDM signal $\lambda_1$ or WDM signal $\lambda_2$ can be converted into optical signals for transmission to a subscriber (not shown) via tributary transmission units 71 and/or 73.

Corresponding connections have been effected between the WDM add unit 60 and the WDM add unit 62, with the result that optical signals received from a customer at tributary receiver units 75 and/or 77 can be added as WDM signals $\lambda_2$ or $\lambda_1$ or both, utilising switches 76 and/or 78.

It will be appreciated by a person skilled in the art that the WDM add/drop structure 50 can provide path protection for signals transmitted on the WDM channel comprising the pair of wavelengths $\lambda_1$, $\lambda_2$ travelling in opposite directions along the optical network 80 to which the WDM add/drop structure 50 is connected. Further more, full, 1+1 port protection to the customer can be provided (i.e. 2 pairs of tributary transmitter and receiver units).

Furthermore, it will be appreciated by the person skilled in the art that, in an alternative embodiment, the WDM drop unit 58 and the WDM add unit 62 of the WDM add/drop module 54 may be designed for wavelengths $\lambda_3$ and $\lambda_4$ respectively, i.e. a different channel when compared with the WDM add/drop module 52. In such an embodiment, channel/wavelength switching can be effected locally (i.e. without relying on other WDM add/drop structures). Effectively, therefore, in such an embodiment path protection can also be effected locally, albeit that it requires switching to a different channel.

Furthermore, in an alternative embodiment, only one pair of tributary transmitter and receiver units may be provided, in which case the path protection is still available, but without 1+1 port protection.

Figure 3:
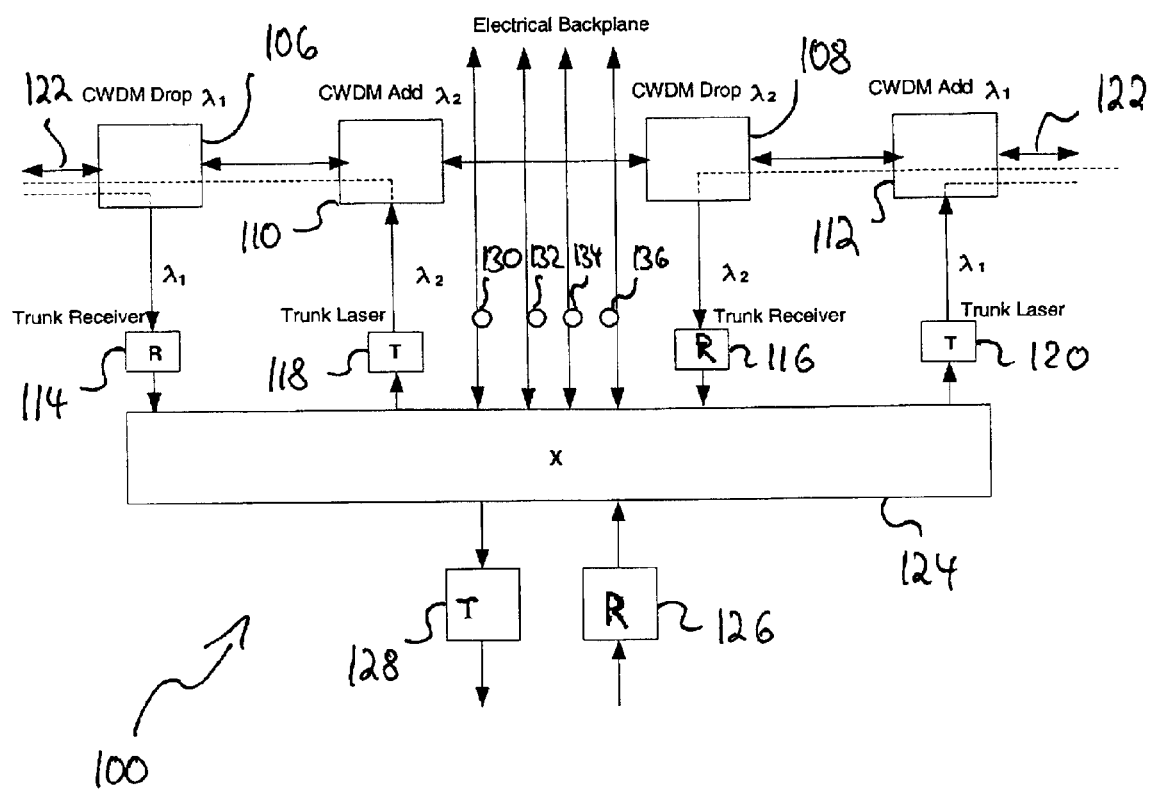
FIG. 3 is another schematic drawing of a WDM add/drop structure embodying the present invention.

FIG. 3 shows another embodiment of a WDM add/drop module 100 which incorporates WDM drop units 106 and 108, designed for wavelengths $\lambda_1$ and $\lambda_2$ respectively. WDM add units 110, 112 of the WDM add/drop module 100 are designed for wavelengths $\lambda_2$ and $\lambda_1$, respectively.

The WDM drop units 106, 108 are connected to trunk receiver units 114, 116 respectively for converting the dropped optical signals into corresponding electronic signals. Trunk transmitter units 118, 120 are connected to the WDM add units 110, 112 respectively, for transmitting an optical signal at the respective wavelength on the optical network 122.

The WDM add/drop structure 100 further comprises an electronic switching unit 124 to which the trunk receiver units 114, 116, the trunk transmitter units 118, 120, tributary receiver unit 126 and a tributary transmitter unit 128 are connected. The electrical switching unit 124 is arranged in a manner such that it is capable of connecting any of the units connected to it with each other, and further to a plurality of electrical duplex ports 130, 132, 134, and 136 for interfacing with other WDM network node structures via an electrical backplane if required.

It will be appreciated by the person skilled in the art, that the WDM add/drop structure 100 can therefore provide both wavelength/channel selection and protection switching.

Figure 4:
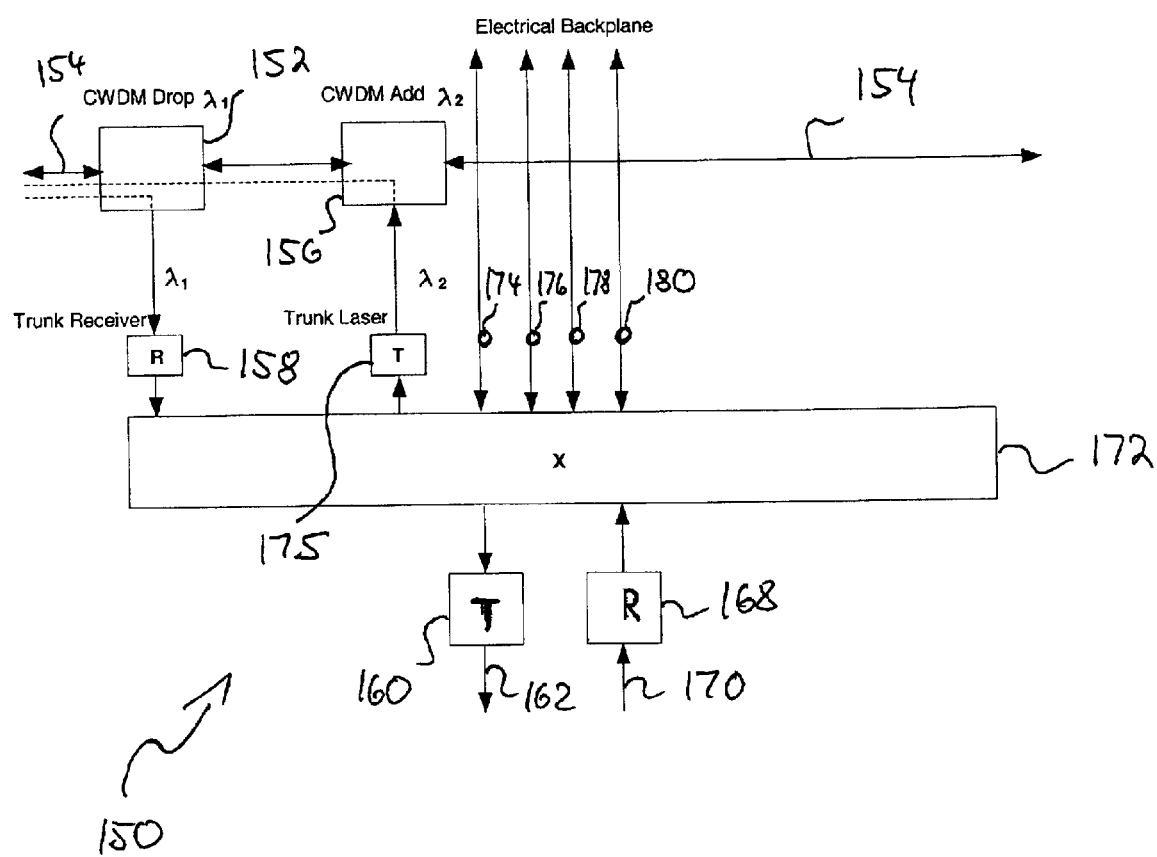
FIG. 4 is a schematic drawing of another WDM add/drop module embodying the present invention.

In FIG. 4, a WDM add/drop module 150 comprises a fixed wavelength drop unit 152 adapted to drop CWDM wavelength $\lambda_1$ travelling in a west-east direction on the optical network 154.

The WDM add/drop module 150 further comprises a WDM add unit 156 for adding a WDM signal at $\lambda_2$ for transmission along an east-west direction along the optical network 154. Together, the wavelength pair $\lambda_1$ and $\lambda_2$ form a bi-directional CWDM channel of the optical network 154.

The WDM add/drop module 150 further comprises a trunk receiver unit 158 for converting the WDM signal at $\lambda_1$, into an electrical signal, and a tributary transmitter unit 160 for converting an electrical input signal into an optical signal for transmission along a tributary optical connection 162 to a subscriber (not shown).

The WDM add/drop module 150 further comprises a tributary receiver unit 168 for receiving an optical signal along a further tributary optical connection 170. It is noted here that the tributary optical connections 162, 170 may be combined into a bi-directional single-fibre connection through an appropriate combiner element. The tributary receiver unit 168 converts the received optical signal into an electrical signal, which is through connected to an electrical switch 172.

The electrical switch 172 is arranged in a manner such that it can connect any of the trunk receiver unit 158, a trunk transmitter unit 175, the tributary receiver unit 168, the tributary transmitter unit 160 with each other or with any one of ports 174, 176, 178, 180 for interfacing with other WDM add/drop modules via an electrical backplane (not shown).

In the embodiment shown in FIG. 4 an unprotected WDM channel service can be provided (wavelength pair $\lambda_1, \lambda_2$), or a fully path protected SONET can be provided using two such modules, giving full, 1+1 port protection to the customer (i.e. 2 pairs of tributary transmitter and receiver units). This illustrates the scalability of WDM add and/or drop modules embodying the present invention.

It will be appreciated by the person skilled in the art that numerous modification and/or variations may be made to the present invention as shown in the specific embodiments without departing from the spirit or scope of the invention as broadly described. The present embodiments are, therefore, to be considered in all respects to be illustrative and not restrictive.

In the claims that follow and in the summary of the invention, except where the context requires otherwise due to express language or necessary implication the word "comprising" is used in the sense of "including", i.e. the features specified may be associated with further features in various embodiments of the invention.

What is claimed is:

1. A WDM drop module for use in a network node of an optical network, the module comprising:
   an optical drop unit for dropping a first wavelength signal travelling along a first path in the optical network traffic,
   a trunk receiver unit for converting the first wavelength signal into a first electrical signal,
   a tributary optical transmitter unit for converting an electrical input signal into an optical signal for transmission along a tributary optical connection,
   wherein the output of the trunk receiver unit is connected to the tributary optical transmitter unit and to a first interface port of the WDM drop module for interfacing with another WDM add and/or drop unit, and
   a switch element arranged in a manner such that, in use, selectively either the first electrical signal or a second electrical signal received at a second interface port of the WDM drop module from another WDM drop module is through connected to the tributary transmitter unit.

2. A WDM drop module as claimed in claim 1, wherein the WDM drop module further comprises a regeneration unit for regenerating the first electrical signal.

3. A WDM drop module as claimed in claim 2, wherein the regeneration unit is adapted to perform 3R regeneration of the first electrical signal.

4. A WDM drop module as claimed in claim 1, wherein the connection between the output of the trunk receiver unit and the tributary optical transmitter unit and the interface port is arranged in a manner such that the trunk receiver unit is selectively connectable to either the tributary optical transmitter unit or the interface port.

5. A WDM drop module as claimed in claim 1, wherein the connection is arranged in a manner such that the trunk receiver unit is connected simultaneously to the tributary optical transmitter unit and to the interface port.

6. A WDM optical network incorporating a WDM drop module as claimed in claim 1.

7. A WDM add module for use in a network node of an optical network, the module comprising:
   a tributary optical receiver unit for converting an optical signal received along a tributary optical connection into a first electrical signal,
   a trunk transmitter unit for converting an electrical input signal into a first wavelength signal,
   an optical add unit for adding the first wavelength signal for transmission along a first path in the optical network traffic,
   a switch unit arranged in a manner such that, in use, selectively either the first electrical signal or a second electrical signal received at a first interface port of the WDM add module from another WDM add module is through connected to the trunk transmitter unit, and
   wherein the output of the tributary optical receiver unit is connected to the switch element and to a second interface port of the WDM add module for interfacing with another WDM add unit.

8. A WDM add module as claimed in claim 7, wherein the WDM add module further comprises a regeneration unit for regenerating the electrical signal.

9. A WDM add module as claimed in claim 8, wherein the regeneration unit is adapted to preform 3R regeneration of the electrical signal.

10. A WDM add module as claimed in claim 7, wherein the connection between the output of the tributary optical receiver unit and the switch element and the interface port is arranged in a manner such that the output of the tributary optical receiver unit is selectively connected to either the switch element or the interface port.

11. A WDM add module as claimed in claim 7, wherein the connection is arranged in a manner such that the output of the tributary optical receiver unit is simultaneously connected to both the switch element and the interface port.

12. A WDM optical network incorporating a WDM add module as claimed in claim 6.

13. A WDM add/drop module for use in a network node of an optical network, the module comprising:
   an optical drop unit for dropping a first wavelength signal travelling along a first path in the optical network traffic,
   a trunk receiver unit for converting the first wavelength signal into a first electrical signal,
   a tributary optical transmitter unit for converting an electrical input signal into a first optical signal for transmission along a tributary optical connection,
   wherein the output of the trunk receiver unit is connected to the tributary optical transmitter unit and to a first interface port of the WDM drop module for interfacing with another WDM drop unit, an electrical switch unit arranged in a manner such that, in use, selectively either the first electrical signal or a second electrical signal received at a second interface port of the WDM add/drop module from another WDM add/drop module is through connected to the tributary transmitter unit for conversion and transmission along the tributary optical connection, a tributary optical receiver unit for converting a second optical signal received along a second tributary optical connection into a third electrical signal, a trunk transmitter unit for converting an electrical input signal into a second wavelength signal, an optical add unit for adding the second wavelength signal for transmission along the first path in the optical network traffic, a switch unit arranged in a manner such that, in use, selectively either the third electrical signal or a fourth electrical signal received at a third interface port of the WDM add/drop module from another WDM add/drop module is through connected to the trunk transmitter unit, and wherein the output of the tributary receiver unit is connected to the trunk transmitter unit and/or to a fourth interface port of the WDM add/drop module for interfacing with another WDM add/drop unit.

14. A WDM add/drop module as claimed in claim 13, wherein the electrical switch elements are implemented as a single electrical switching unit.

15. A WDM add/drop module as claimed in claim 14, wherein the electrical switching unit is further arranged in a manner which provides the connections to the first and fourth interface ports.

16. A WDM add/drop module as claimed in claim 15, wherein the WDM add/drop unit further comprises:

a further optical drop unit for dropping a third wavelength signal travelling along a second path in the optical network traffic, a further trunk receiver unit for converting the third wavelength signal into a fifth electrical signal, a further trunk transmitter unit for converting an electrical input signal into a fourth wavelength signal, a further optical add unit for adding the fourth wavelength signal for transmission along the second path in the optical network traffic, and the electrical switching unit is arranged in a manner such that, in use, selectively either the first, second, or fifth electrical signal is through connected to the tributary transmitter unit for conversion and transmission along the tributary optical connection, and such that the third electrical signal is through connected to the first and/or the further trunk transmitter units and/or to the fourth interface port.

17. A WDM add/drop module as claimed in claim 16, wherein the third and fourth wavelength signals are of the same wavelength as the first and second wavelength signals respectively.

18. A WDM add/drop module as claimed in claim 17, wherein the regeneration unit is adapted to perform 3R regeneration of the first, and/or third, and/or fourth and/or fifth electrical signals.

19. A WDM add/drop module as claimed in claim 16, wherein the third and fourth wavelength signals are different from the first and second wavelength signals respectively.

20. A WDM add/drop module as claimed in claim 16, wherein the WDM add/drop module further comprises a regeneration unit for regenerating the first, and/or third, and/or fourth electrical signals.

21. A WDM optical network incorporating a WDM add/drop module as claimed in claim 16.

22. A WDM add/drop module as claimed in claim 13, wherein the connection between the output of the trunk receiver unit and the tributary optical transmitter unit and the first interface port is arranged in a manner such that the trunk receiver unit is selectively connectable to either the tributary optical transmitter unit or the first interface port.

23. A WDM add/drop module as claimed in claim 13, wherein the connection is arranged in a manner such that the trunk receiver unit is connected simultaneously to the tributary optical transmitter unit and to the first interface port.

24. A WDM add/drop module as claimed in claim 13, wherein the connection between the output of the tributary optical receiver unit and the switch element and the fourth interface port is arranged in a manner such that the output of the tributary optical receiver unit is selectively connected to either the switch element or the fourth interface port.

25. A WDM add/drop module as claimed in claim 13, wherein the connection is arranged in a manner such that the output of the tributary optical receiver unit is simultaneously connected to both the switch element and the second interface port.

26. A WDM optical network incorporating a WDM add/drop module as claimed in claim 13.

* * * * *